United States Patent
Buis et al.

(10) Patent No.: US 7,562,294 B1
(45) Date of Patent: Jul. 14, 2009

(54) FORMATTING COMPUTER GENERATED DOCUMENTS FOR OUTPUT

(75) Inventors: Roger L. Buis, Longmont, CO (US); Reinhard Heinrich Hohensee, Boulder, CO (US); Susan Cheryl McElrafth, Longmont, CO (US); Alan Lee Middendorf, Longmont, CO (US); Jamsie R. Treppendahl, Boulder, CO (US)

(73) Assignee: InfoPrint Solutions Company LLC, Boulder, CO (US)

( * ) Notice: Subject to any disclaimer, the term of this patent is extended or adjusted under 35 U.S.C. 154(b) by 0 days.

(21) Appl. No.: 09/475,963

(22) Filed: Dec. 30, 1999

(51) Int. Cl.
*G06F 17/00* (2006.01)
(52) U.S. Cl. .............. 715/243; 715/204; 715/235; 715/209
(58) Field of Classification Search ............ 715/517, 715/513, 520, 522, 243, 204, 235, 209
See application file for complete search history.

(56) References Cited

U.S. PATENT DOCUMENTS

| | | | | |
|---|---|---|---|---|
| 5,182,705 | A | 1/1993 | Barr et al. | 364/401 |
| 5,557,515 | A | 9/1996 | Abbruzzese et al. | 364/401 |
| 5,586,241 | A | 12/1996 | Bauermeister et al. | 395/167 |
| 5,680,615 | A | 10/1997 | Marlin et al. | 395/614 |
| 5,684,934 | A | 11/1997 | Chen et al. | 395/113 |
| 5,708,806 | A * | 1/1998 | DeRose et al. | 707/104.1 |
| 5,742,837 | A * | 4/1998 | Fukui et al. | 715/517 |
| 5,768,488 | A | 6/1998 | Stone et al. | 395/117 |
| 5,791,790 | A | 8/1998 | Bender et al. | 400/61 |

(Continued)

FOREIGN PATENT DOCUMENTS

EP  0 278 722 A3  9/1988

(Continued)

OTHER PUBLICATIONS

W3C, HTML 4.01 Specification: W3C Recommendation, Dec. 24, 1999, esp. ch. 11.*

(Continued)

*Primary Examiner*—Stephen S Hong
*Assistant Examiner*—Matthew J Ludwig
(74) *Attorney, Agent, or Firm*—Blakely, Sokoloff, Taylor & Zafman LLP (57) ABSTRACT

A method and apparatus for formatting a computer-generated document for output, such as printing, is provided. Information necessary to generate a document is extracted from a database. The extraction program assigns a layout identifier to each data record retrieved from the database based on the type of information contained within the data record and how the information is to be formatted in the document. A layout program assigns specific layout parameters to each layout identifier, which specify the placement of an associated print data record within a document. Next, a formatting program applies the set of layout parameters to a data stream containing a plurality of data records to create a formatted document. The various elements of the invention such as the data extraction program, the database, the layout program and the formatter, may be integrated into a single software program, co-resident on a single computer system, or distributed across various computer systems on a network. It is also contemplated that the one or more of the various elements of the invention such as the formatter, the extraction program, or the layout program could be embodied as hardware instead of software.

14 Claims, 12 Drawing Sheets

U.S. PATENT DOCUMENTS

| | | | |
|---|---|---|---|
| 5,819,015 A | 10/1998 | Martin et al. | 395/114 |
| 5,845,302 A | 12/1998 | Cyman, Jr. et al. | 707/517 |
| 5,873,659 A | 2/1999 | Edwards et al. | 400/61 |
| 5,899,975 A * | 5/1999 | Nielsen | 704/270.1 |
| 6,014,677 A * | 1/2000 | Hayashi et al. | 707/104.1 |
| 6,208,345 B1 * | 3/2001 | Sheard et al. | 715/853 |
| 6,243,501 B1 * | 6/2001 | Jamali | 382/305 |
| 6,466,954 B1 * | 10/2002 | Kurosawa et al. | 715/520 |
| 6,484,166 B1 * | 11/2002 | Maynard | 707/5 |
| 6,589,292 B1 * | 7/2003 | Langford-Wilson | 715/517 |
| 6,718,329 B1 * | 4/2004 | Selvin et al. | 707/10 |
| 6,763,343 B1 * | 7/2004 | Brooke et al. | 707/1 |
| 6,826,727 B1 * | 11/2004 | Mohr et al. | 715/517 |
| 6,854,086 B2 * | 2/2005 | Umen et al. | 715/513 |
| 6,882,441 B1 * | 4/2005 | Faust et al. | 358/1.18 |
| 7,076,502 B2 * | 7/2006 | Shoup et al. | 707/102 |
| 7,274,479 B2 * | 9/2007 | Gauthier | 358/1.15 |

FOREIGN PATENT DOCUMENTS

| | | |
|---|---|---|
| EP | 0814425 A2 | 12/1997 |
| JP | 10232946 | 9/1998 |

OTHER PUBLICATIONS

Hâkon Wium Lie, W3C Core Styles, 1997.*
IBM Technical Disclosure Bulletin, vol. 38 No. 8, Aug. 1995, pp. 183-184.
U.K. Search Report dated Feb. 21, 2001.

* cited by examiner

| | | | | | | |
|---|---|---|---|---|---|---|
| TEST COMPANY | | | | SAME | | |
| TEST STREET | | | | | | |
| TEST CITY | | | | | | |
| TS | 12345-6789 | | | | | |
| | 100 | | 31300 | 11/06/95 | 12/06/95 | |
| | BEST WAY | | 11/06/95 | NET 30 | TESTSALES | |
| 1 | CT | 00000300 | HIGH ALTITUDE WATERMELON | | 1.01 | 1.01 |
| 1 | PK | 01100517 | SPARTAN SEEDS | | 2.39 | 2.39 |
| 9 | PK | 04569878 | NORTHERN LITE BLUE SPRUCE | | 858.32 | 7,724.88 |
| 12 | BX | 11005004 | BUSH GREEN SEEDS | | 2.50 | 30.00 |
| 12 | CT | 11005011 | LASSO RED SEEDS | | 892.23 | 10,706.76 |
| 26 | PK | 11005018 | EARLY BANTAM SEEDS | | .38 | 9.88 |
| 5 | BX | 11057893 | AFRICAN DAISY, SEEDS | | 2.35 | 11.75 |
| 1 | PK | 15975365 | HEAVY OAK | | 129.09 | 129.09 |
| 33 | BX | 32746510 | HOPS BREWING LIGHT | | 1.20 | 39.60 |
| 33 | BX | 32746510 | HOPS BREWING LIGHT | | 1.20 | 39.60 |
| 6 | EA | 46578913 | SEED SURVEYING SITE | | 50.00 | 300.00 |
| 2 | BX | 56413213 | POT POT | | 7.65 | 15.30 |
| 80 | PK | 65412384 | SEED SCRUBBER | | 888.79 | 71,103.20 |
| 1 | PK | 84512023 | OREGON SPRING TOMATO SEED | | .97 | .97 |
| 2 | DZ | 996325874 | PINEAPPLE-ORANGE SEEDS | | 1.29 | 2.58 |
| 11 | BX | 98412006 | BLACK BEAUTY ZUCCHINI | | 2.30 | 25.38 |
| 5 | EA | 98546329 | FROZEN JUICE PROCESSOR | | 109.90 | 549.50 |

Thank You .....
Because you have ordered
over $500 of seeds this
year, on your next seed
order you will receive
a 10% discount.

*PRIOR ART*

| | | | | | |
|---|---|---|---|---|---|
| statmid | 626-257311 Chubby Checker | | 123 Redlight Lane | Twistnshout | MA 82345 |
| statsum | $2591.24 | $1946.93 | $1956.43 | $0.00 | $2581.72 |
| crheader | | | | | |
| crdata | DEPOSIT | 01/05/90 | $ 26.98 | | |
| crdata | AUTO DEPOSIT | 01/15/90 | $ 954.27 | | |
| crdata | AUTO DEPOSIT | 01/30/90 | $ 954.27 | | |
| crdata | INTEREST | 01/31/90 | $ 11.49 | | |
| crtotal | | | $1946.93 | | |
| ckheader | 352 | | | | |
| ckdata1 | 353 | 01/04/90 | $ 321.50 | | |
| ckdata1 | 354 | 01/05/90 | $ 100.00 | | |
| ckdata1 | 355 | 01/18/90 | $ 122.30 | | |
| ckdatar | 356 | 01/11/90 | $ 59.95 | | |
| ckdatar | 357 | 01/15/90 | $ 852.33 | | |
| ckdatar | | 01/30/90 | $ 500.35 | | |
| cktotal | | | $ 956.43 | | |
| balhead | | | | | |
| baldata1 | | 01/04/90 | $2269.74 | | |
| baldata1 | | 01/05/90 | $2196.64 | | |
| baldata1 | | 01/10/90 | $2074.34 | | |
| baldatar | | 01/11/90 | $2014.39 | | |
| baldatar | | 01/15/90 | $2116.33 | | |
| baldatar | | 01/30/90 | $2570.25 | | |
| baltotal | | | $2581.74 | | |
| statrail | | | | | |

*FIG. 7*

Big Brother Bank

*"We watch over you"*
P.O. Box 1573
Beantown, MA 02116

Account Number: 026-257311
Statement Begin Date: JAN 02, 1990
Statement End Date: FEB 01. 1990

```
Chubby Checker
123 Redlight Lane
Twistnshout, MA   02345
```

Super Checking Account Activity

| Beginning Balance | Credits | Debits | Service Charge | Ending Balance |
|---|---|---|---|---|
| $2591.24 | $1946.93 | $1956.43 | $0.00 | $2581.74 |

| Credits | Description | Date | Amount | | |
|---|---|---|---|---|---|
| | DEPOSIT | 01-05-90 | $ 26.90 | | |
| | AUTO DEPOSIT | 01-15-90 | $ 954.27 | | |
| | AUTO DEPOSIT | 01-30-90 | $ 954.27 | | |
| | INTEREST | 01-31-90 | $ 11.49 | | |
| | Total Credits | | | | $1946.93 |

| Checks | Check No. | Date | Amount | Check No. | Date | Amount |
|---|---|---|---|---|---|---|
| | 352 | 01/04/90 | $ 321.50 | 355 | 01/11/90 | $ 59.95 |
| | 353 | 01/05/90 | $ 100.00 | 356 | 01/15/90 | $ 852.33 |
| | 354 | 01/10/90 | $ 122.30 | 357 | 01/30/90 | $ 500.35 |
| | Total Checks | | | | | $1956.43 |

| Daily Balances | Date | Balance | Date | Balance |
|---|---|---|---|---|
| | 01/04/90 | $2269.74 | 01/11/90 | $2014.39 |
| | 01/05/90 | $2196.64 | 01/15/90 | $2116.33 |
| | 01/10/90 | $2074.34 | 01/30/90 | $2570.25 |
| | Final Balance | | | $2581.74 |

Interest Rate As of    01-04   • • •   5.321%

Page 1

*FIG. 8*

```
/**************************************************/
/** statsum BODY                                **/
/**************************************************/
```
905 → LAYOUT statsum BODY 910 →
```
    FIELD  TEXT C'Super Checking Account Activity
                    POSITION  0 in 2.0 in
                    FONT super ; /* Static text - Super Checking */
    DRAWGRAPHIC LINE  ACROSS 7.5 IN BOLD
           POSITION  0  .15 in
           repeat down 2 spaced 1 mm;
```

915 →
```
    FIELD  TEXT C'Beginning Balance'
                    POSITION  .3 in 2.4 in
                    FONT head  ; /* Static text - first header  */
    FIELD  TEXT C'Credits'
                    POSITION 2.4 in 2.4 in
                    FONT head  ; /* Static text - first header  */
    FIELD  TEXT C'Debits'
                    POSITION 3.6 in 2.4 in
                    FONT head  ; /* Static text - first header  */
    FIELD  TEXT C'Service Charge'
                    POSITION 4.8 in 2.4 in
                    FONT head  ; /* Static text - first header  */
    FIELD  TEXT C'Ending Balance'
                    POSITION 6.3 in 2.4 in
                    FONT head  ; /* Static text - first header  */
```

920 →
```
    FIELD  START 11 LENGTH  8
                    POSITION 1.4 in 2.6 in
                    FONT varb  ; /* Variable text - Beg balance */
    FIELD  START 20 LENGTH  8
                    POSITION 3.1 in 2.6 in
                    FONT varb  ; /* Variable text - Credits     */
    FIELD  START 30 LENGTH  8
                    POSITION 4.6 in 2.6 in
                    FONT varb  ; /* Variable text - Debits      */
    FIELD  START 40 LENGTH  8
                    POSITION 5.7 in 2.6 in
                    FONT varb  ; /* Variable text - Service Chrg */
    FIELD  START 50 LENGTH  8
                    POSITION 7.3 in 2.6 in
                    FONT varb  ; /* Variable text - End Balance */
```

920 →
```
    DRAWGRAPHIC LINE  ACROSS 7.5 IN BOLD
           POSITION  0.7 in;
```

*FIG. 9*

```
/***************************************************/
/** ckdata1 BODY left side                       **/
/***************************************************/
LAYOUT ckdata1 BODY GROUP;
    FIELD   START 12 LENGTH 3
                    POSITION 1.4 in  NEXT
                    FONT    varb ; /* Variable text - Check number */
    FIELD   START 24 LENGTH 8
                    POSITION 2.4 in  CURRENT
                    FONT    varb ; /* Variable text - Date           */
    FIELD   START 34 LENGTH 8 ALIGN RIGHT
                    POSITION 4.2 in  CURRENT
                    FONT    varb ; /* Variable text - Amount         */
```

*FIG. 10*

FORMATTING COMPUTER GENERATED DOCUMENTS FOR OUTPUT

FIELD OF THE INVENTION

The invention relates generally to computer formatting of documents for output. More specifically, the invention relates to a method of formatting a data stream, where each data record contains a layout identifier, according to a set of layout parameters.

BACKGROUND OF THE INVENTION

Invoices, financial statements, and telephone records are examples of documents that typically contain information or data specific to a specific person or entity. The information or data contained in these documents is generally generated by a computer running a data extraction program designed to mine the data from a database. Periodically, a statement may be generated, printed and sent to an account holder for his/her records and review.

Figure 1A:
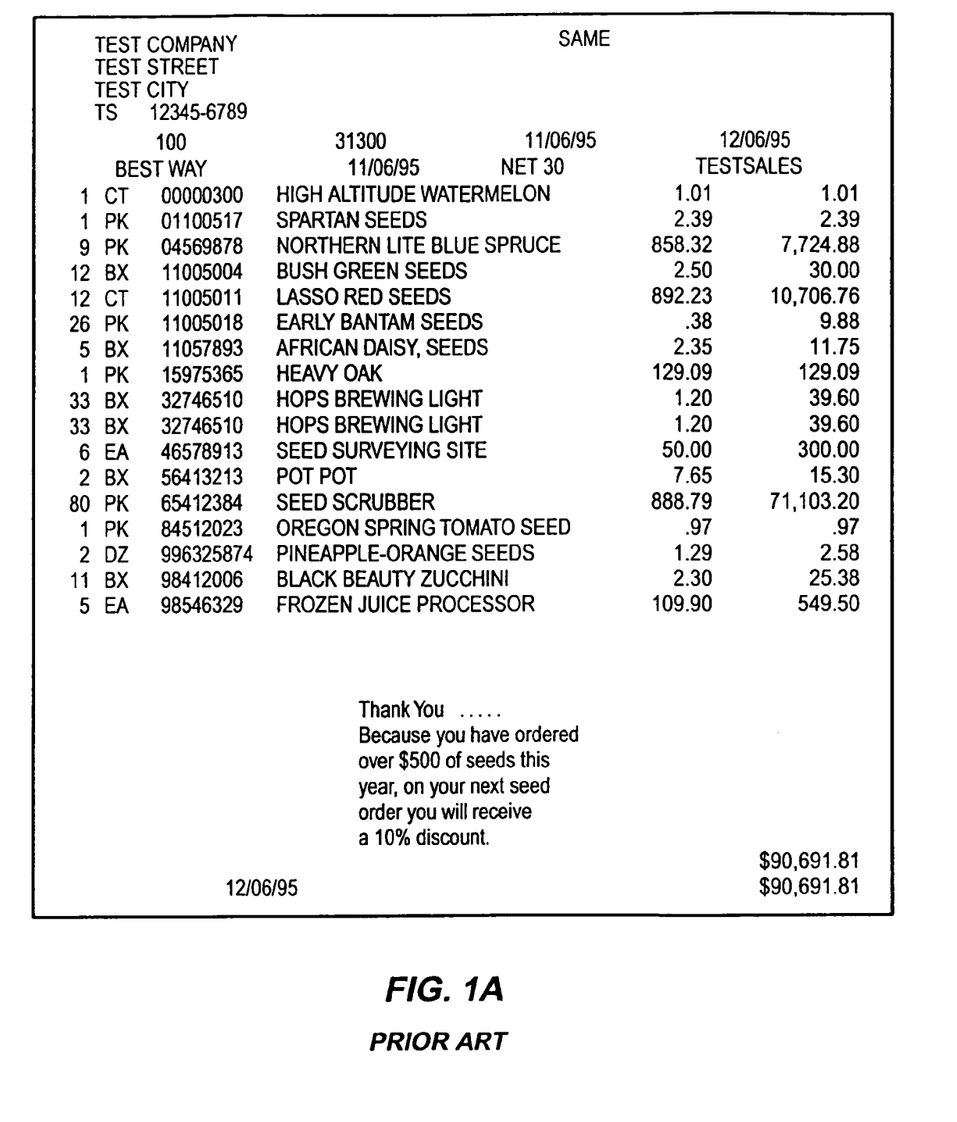
FIG. 1a is an example of line data produced by a data extraction program in the prior art.

During early days of computer-generated documents, documents containing data specific to a certain account holder were printed on impact printers that were limited to producing line output of EBCDIC or ASCII characters. Accordingly, a data stream was formatted by a data extraction program such that each data record represented one line on the resulting printed document. FIG. 1a is an example of line data for a customer invoice produced by a data extraction program.

Figure 1B:
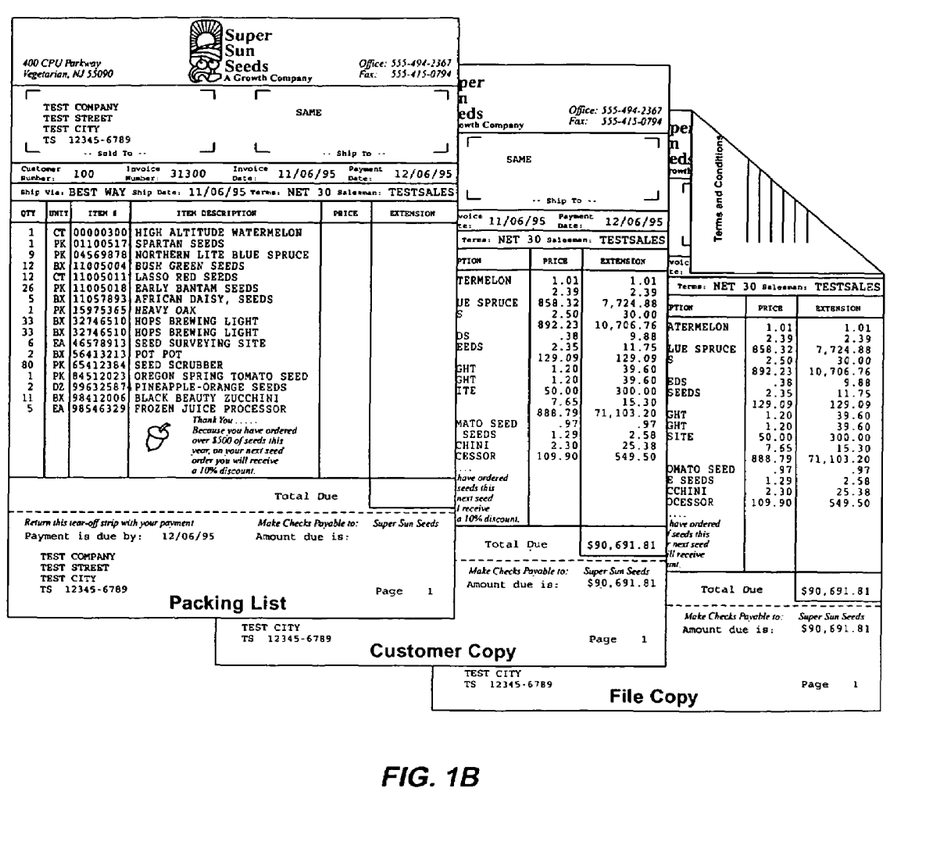
FIG. 1b is an example of printed output produced using the line data from FIG. 1a under the prior art.

The formatted data was often printed on preproduced forms containing headers, footers, logos, lines, columns and rows. FIG. 1b is an example of the customer invoice resulting from the line data in FIG. 1a.

As printer technology advanced, so did the demand for more sophisticated printed output. The advent of electrostatic and inkjet printers eliminated the need to have preprinted forms containing graphics, logos or any other standard data that is fixed for all documents of a certain type, since the printers were capable of printing both the standard data and the variable data concurrently.

Formatting programs were developed to reformat and remap line data received from the data extraction program and to merge the line data with the standard information on a document. However, because these formatting programs rely on line data received from legacy data extraction programs that did not have a mechanism to facilitate complex formatting the line data records, the formatting programs typically rely upon conditional processing to identify the occurrence of specific text strings or combinations thereof at specific locations in the line data to remap the line data based on these occurrences. One of the primary limitations of this remapping method is that it relies on the ability of the formatting program to distinguish between types of data based on the content of the line data. If two different types of data are similar in form, location and/or structure within the line data, the formatter may not be able to distinguish between. As a result, these formatting programs are limited with regard to the amount and complexity of the reformatting possible.

Another method used to format line data was to use the skip to channel controls to place line data sequentially on a printed page. Typically, a number from 1 to 12 was placed in the first two columns of a plurality of line data records. At first, the numbers were provided to indicate to an impact printer to skip a certain number of lines on a page before printing the succeeding data record for the purpose of saving printing time by not requiring the relatively slow impact printer to scroll across what would end up as blank lines on a finished document. As print technology advanced, the skip to channel numbers were used by a formatter to define placement of a line data record at a fixed vertical position on a page. For instance, a "1" in the first column of a line data record might indicate to skip to the next page before printing the line data following the number "1," or a "2" might indicate that the line data following it be printed three lines below the top of the page. The process is limiting in that the skip to channel control only controls placement of a line record relative to the top of the page.

Another method of obtaining complex formatted printed documents has been to integrate the function of producing complex document layouts within the data extraction program. Essentially, the data extraction program formats the data record into a desired format rather than as line data. This method allows the creation of complex document formats but it can be expensive. For instance, a tailored data extraction program might be required for each document type, and any changes to a document's format requires that the data extraction program be reprogrammed. Additionally, any programmer tasked to program or reprogram the data extraction program to implement a new document format would potentially have access to sensitive data stored in the database; thereby, creating a potential security risk.

In view of the foregoing, it is desirable to have a method for formatting a document containing variable data that offers a high degree of flexibility in the arrangement of print data as to take full advantage of the capabilities of electrostatic and inkjet printers. It is also desirable that the method minimize the expense of generating formatted documents and that a format for a specific document be capable of easy modification without requiring access to the data extraction program.

SUMMARY OF THE INVENTION

A method and apparatus are disclosed for formatting a data stream, which has a layout identifier for each data record contained therein, according to a set of layout parameters. Embodiments of the current invention include a number of elements and limitations with no single element or limitation contemplated as being critical. Each claim, individually, recites an aspect of the invention in its entirety. Embodiments of the present invention include methods, computer-readable mediums containing instructions for performing a method, and computer systems. The embodiments described herein embody various aspects and configurations of the invention.

According to one embodiment of the invention, a method of formatting documents includes assigning a layout identifier to each data record retrieved from a database based on the type of data contained within the data record and how the data is to be formatted in the document. Specific layout parameters are assigned to each layout identifier that specify the placement of an associated print data record within a document to form, collectively, a set of layout parameters. Next, the set of layout parameters are applied to a data stream and each of the data records contained therein to create a formatted document. In different embodiments of the system the various elements of the system may be integrated into a single software program, co-resident on a single computer system, or distributed across various computer systems. It is contemplated that one or more of the various elements of the invention could be embodied as hardware or software.

In another embodiment, a formatter receives a data stream in which each data record therein is associated with a layout identifier. The formatter also receives a set of layout parameters in which formatting instructions are provided corresponding to each layout identifier. The layout parameters corresponding to a particular layout identifier are applied to each data record associated with the particular layout identifier. The result of the formatting process is a document that may be sent to an output device for display or printing.

In another embodiment, a data extraction program retrieves data from a database. The data is arranged into data records to form collectively a data stream. A layout identifier is associated with each data record, where the layout identifier identifies certain characteristics of the data record to which it is associated. The one or more data records and the associated layout identifiers are sent to a formatting program.

In another embodiment, a layout program specifies layout parameters for each layout identifier that is or is likely to be present in a particular type of document in the form of layout parameters. The specific layout parameters for each layout identifier are combined to form a set of layout parameters. The set of layout parameters corresponding to a certain document type are sent to a formatter.

Other features of the present invention will be apparent from the accompanying drawings and from the detailed description that follows.

BRIEF DESCRIPTION OF THE DRAWINGS

The appended claims set forth the features of the present invention with particularity. The invention is illustrated by way of example, and not by way of limitation, from the following detailed description taken in conjunction with the accompanying drawings of which:

DETAILED DESCRIPTION OF THE PREFERRED EMBODIMENT

A method and apparatus are disclosed for formatting a data stream, which has a layout identifier for each data record contained therein, according to a set of layout parameters. Embodiments of the invention provide a flexible process for formatting data records extracted from a database for forwarding to an output device such as a display or printer in which visually pleasing and potentially complex documents may be produced. An additional advantage of the invention is that it provides for quick and inexpensive modification of a document format without having to reprogram.

The invention is not limited to a single computing environment. Moreover, the architecture and functionality of the invention as taught herein and as would be understood by one skilled in the art is extensible to a number of computing environments and embodiments in keeping with the scope and spirit of the invention. The invention provides for various methods, computer-readable medium containing computer-executable instructions, and apparatus. With this in mind, the embodiments discussed herein should not be taken as limiting the scope of the invention; rather, the invention contemplates all embodiments as may come within the scope of the appended claims.

Terminology

Format Region—An area within a page of a document (e.g., a page header, a page footer, a body, and a group header). All data and information contained within the format region follow the layout conventions assigned to that format region.

Layout identifier—A name or handle associated with a data record in a data stream. Typically, a layout identifier acts to identify the type of data within an associated data record and allows the formatter to associate the data record with particular formatting instructions.

Layout Parameters—a series of formatting instructions for data records contained in a data stream and for format areas. Typically, layout parameters will specify how a particular data record will be formatted in a document based on the layout identifier associated with it. Additionally, there may be layout parameters that specify the location and size of various format areas within a document. A set of layout parameters contains layout parameters for each type of layout identifier present in a related data stream, as well as, formatting instructions for any format regions defined for the resulting formatted document.

An Exemplary Computer System

Figure 2:
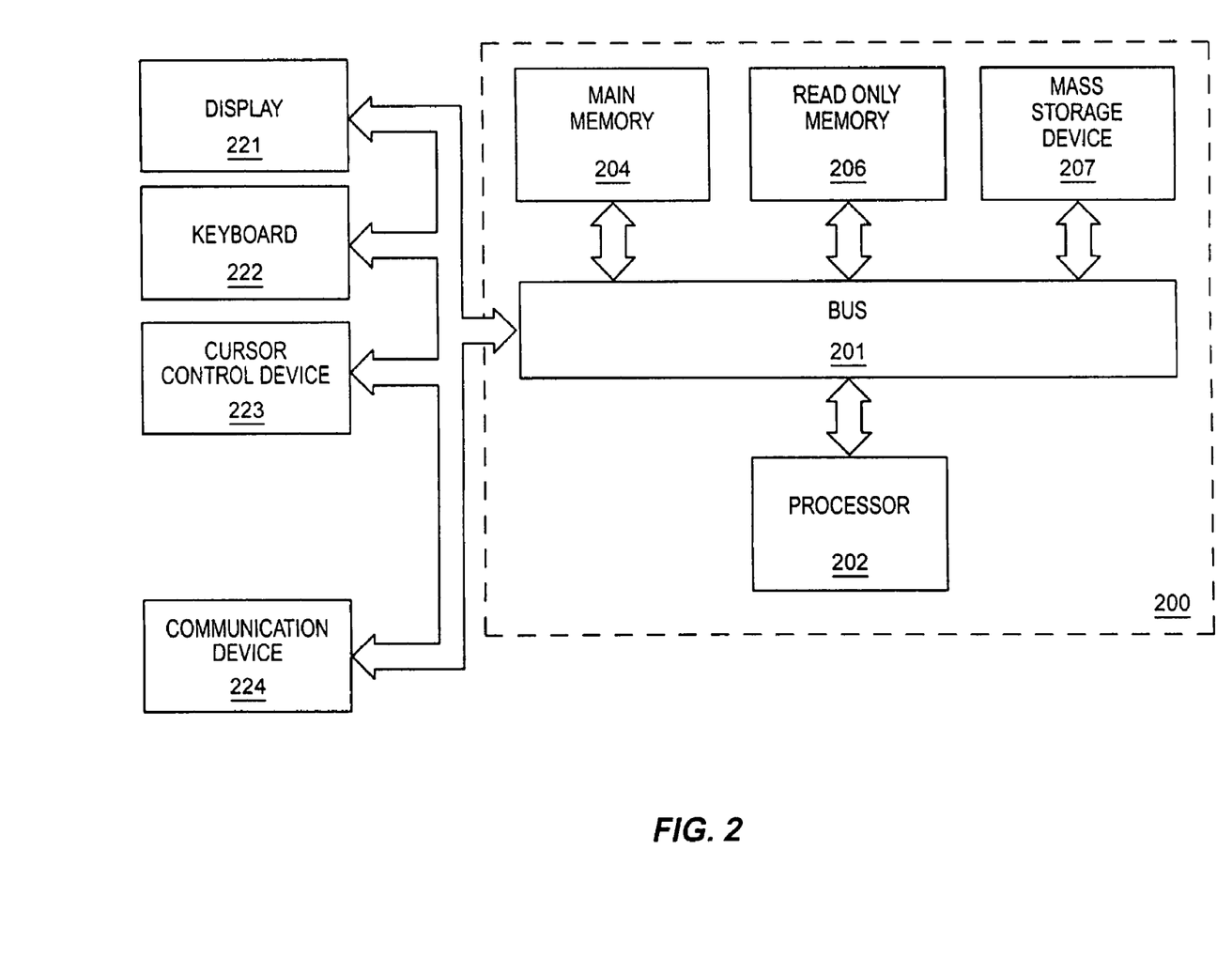
FIG. 2 is an illustration of an exemplary computer system upon which embodiments of the present invention may be implemented.

FIG. 2 provides an exemplary computer system in which the features of the present invention may be implemented.

Computer system 200 comprises a bus or other communication means 201 for communicating information, and a processing means such as processor 202 coupled with bus 201 for processing information. Computer system 200 further comprises a random access memory (RAM) or other dynamic storage device 204 (referred to as main memory), coupled to bus 201 for storing information and instructions to be executed by processor 202. Main memory 204 also may be used for storing temporary variables or other intermediate information during execution of instructions by processor 202. Computer system 200 also comprises a read only memory (ROM) and/or other static storage device 206 coupled to bus 201 for storing static information and instructions for processor 202.

A data storage device 207 such as a magnetic disk or optical disc and its corresponding drive may also be coupled to computer system 200 for storing information and instructions. Computer system 200 can also be coupled via bus 201 to a display device 221, such as a cathode ray tube (CRT) or Liquid Crystal Display (LCD), for displaying information to a computer user. Typically, an alphanumeric input device 222, including alphanumeric and other keys, is coupled to bus 201 for communicating information and/or command selections to processor 202. Another type of user input device is a cursor controller 223, such as a mouse, a trackball, or cursor direction keys for communicating direction information and command selections to processor 202 and for controlling cursor movement on display 221.

A communication device 224 may also be coupled to bus 201 for accessing remote servers, or clients. The communication device 224 may include a modem, a network interface card, or other well-known interface devices, such as those used for coupling to an Ethernet, token ring, or other types of networks. Through this communication device 224, the computer system 200 may be coupled to a number of servers via a conventional network infrastructure, such as a company's Intranet and/or the Internet, for example.

The invention as claimed in various embodiments may be practiced on a single computer system or the various elements of the invention may be distributed over several computer systems.

An Exemplary Method of Formatting Documents

Figure 3:
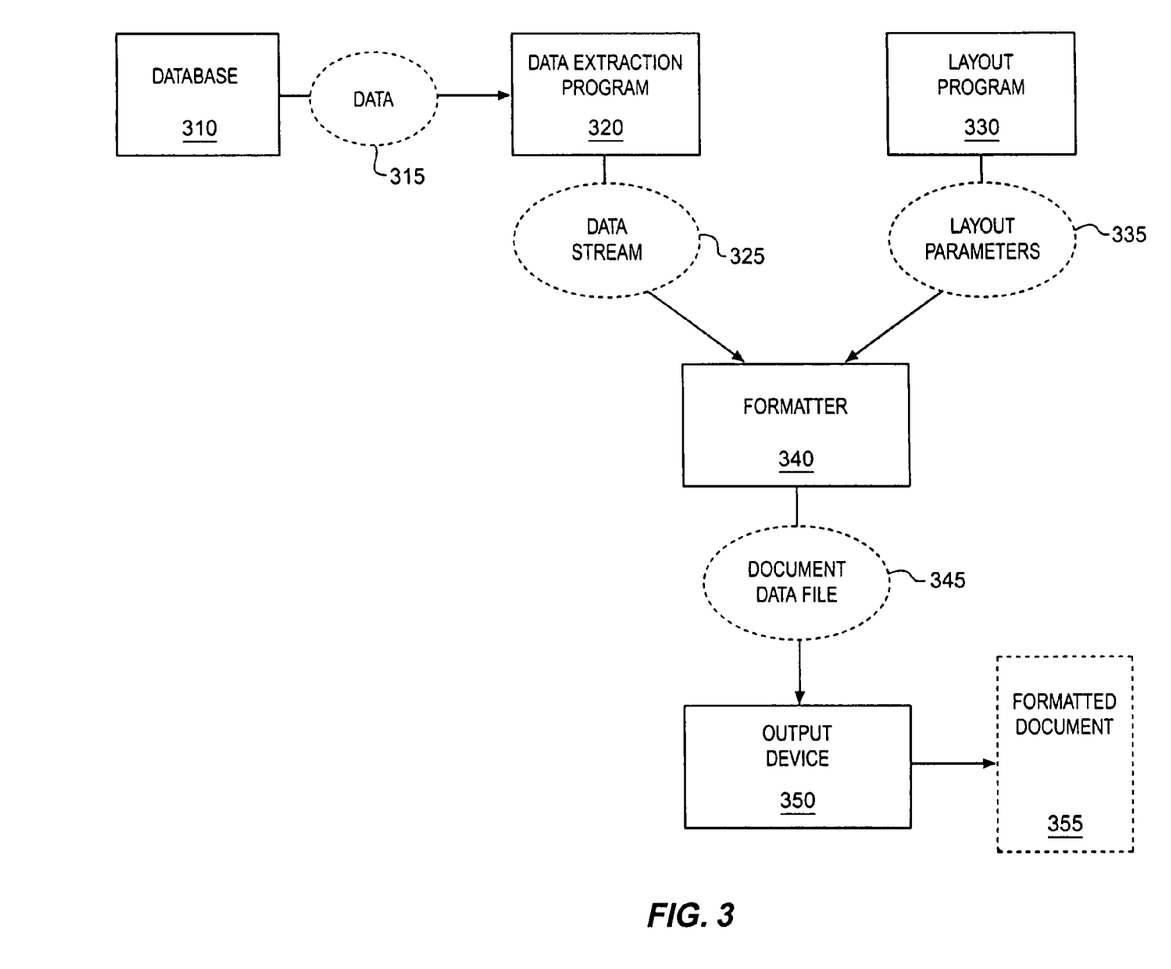
FIG. 3 is a block diagram illustrating a computing environment in which embodiment of the invention may be practiced.

FIG. 3 illustrates an exemplary computing environment in which one embodiment of the invention may be practiced. This example shows various elements involved in the process of creating a formatted document 355 of one or more pages that contains formatted data as retrieved from a database 310. Although the embodiment discussed herein references a printed document, it is to be understood that the presentation format of the document produced using the invention is not critical. A document could encompass any conceivable format that is produced by an output device, including information displayed on a computer monitor.

Whenever a formatted document 355, consisting of data extracted and derived from a database 310, is desired, a data extraction program 320 is run to retrieve data 315, perform calculations as necessary on the data 315, create a data stream 325 comprising data records, and associate a layout identifier with each line data record. Next, the line data stream 325 is sent to a formatter 340.

A set of layout parameters 335 are created by a layout program 330 that specify rules and layout information relative to the formatter 340 to layout the formatted document 355. The layout program 330 sends the set of layout parameters 335 to the formatter 340. It is envisioned in certain embodiments that the layout program 330 could be run on a computer using a Windows O/S, where the layout program 330 provides a GUI interface to which the user can generate a facsimile of a desired formatted document 355 based on the generated set of layout parameters 335 for review prior to sending the layout parameters 335 to the formatter.

When the formatter 340 receives the data stream 325, the formatter 340 associates the data stream 325 with a set of layout parameters 335 and applies the rules and information contained within the set of layout parameters 335 to the data stream 325 to create a document data file 345 that is sent to an output device 350. Finally, an output device 350, such as a printer or a monitor, produces the formatted document 355.

An Exemplary Data Extraction Program

Figure 4:
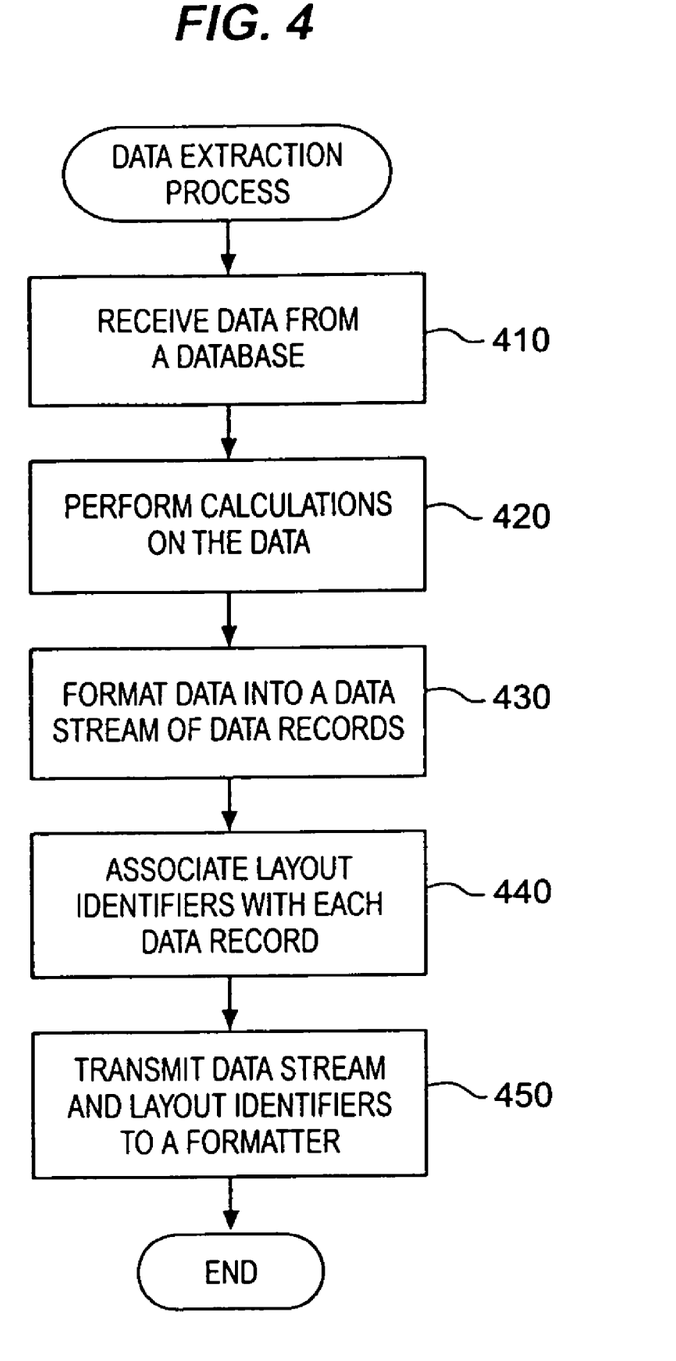
FIG. 4 is a flow diagram for an exemplary data extraction program.

FIG. 4 is a flow diagram showing the steps performed by an exemplary data extraction program 320. First in step 410, the data extraction program 320 requests and receives raw data 315 from the database 310. As necessary in step 420, the data extraction program 320 performs calculations on the data 315 creating new data or information to be included in the formatted document 355. For instance, the data extraction program 320 might determine an average from a set of numbers contained in the data 315. The data 315 and any new data are arranged into data stream 325 comprising a plurality of data records as shown in step 430. In step 440, a layout identifier is then associated with each data record based on the type and nature of the information contained within the particular data record. Finally in step 450, the data stream 325 and the associated layout identifiers are sent to a formatter 340.

It is envisioned that the data extraction program 320 could be implemented in software or hardware in a number of different embodiments. For instance, the data extraction program 320 could be resident on a computer system 200 containing the database 310, or it could reside on another computer system 200 that interacts with the computer system 200 containing the database 310 over a network. Alternatively, the data extraction program 320 could be a routine of a database program. Furthermore, the steps and the order of steps in FIG. 4 are merely exemplary and as such, it is envisioned that a data extraction program 320 may have more or less steps than illustrated and that the steps may be performed in a different order than illustrated.

An Exemplary Layout Program

Figure 5:
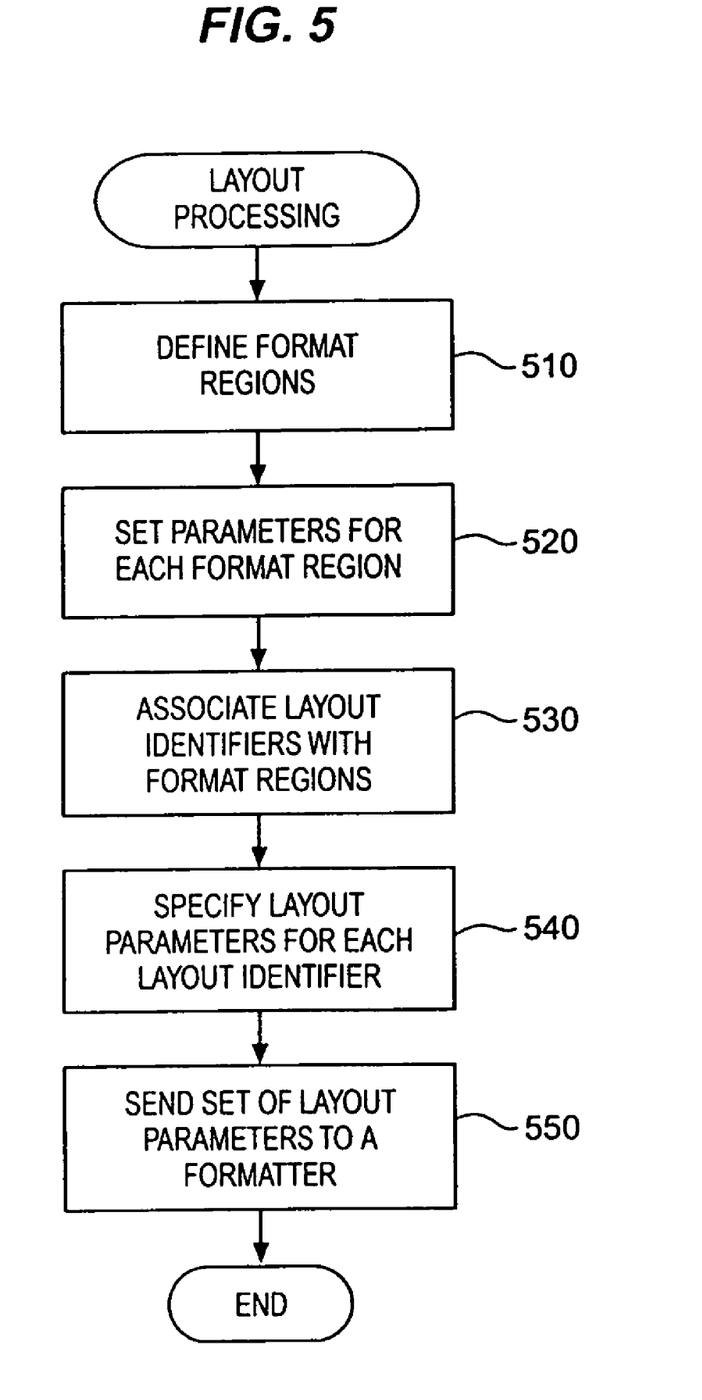
FIG. 5 is a flow diagram for an exemplary layout program.

FIG. 5 is a flow diagram showing the steps performed by an exemplary layout program 330 in the creation of a set of layout parameters 335.

The first step 510 in generating a set of layout parameters 335 is to setup and define various format regions that will appear on a page within a document. Essentially, a format region defines an area on a page where all data contained within the format region follow the layout conventions assigned to that format region. For some embodiments of the invention, format regions are not specified.

A typical document page might include a page header, a body, and a page trailer. There may also be group headers that are printed on a page preceding certain groups of data. Additionally, other format regions are contemplated. Parameters are set for each format region in step 520, such as where the format region will appear on a formatted page, and whether its location on the page is relative to other format regions. Definitions of typical format regions are provided below:

| | |
|---|---|
| BODY | The majority of the data retrieved from a data extraction program 320 as data records are placed in this format region on a formatted document 355. Typically, data contained herein is printed line by line. |
| PAGEHEADER | This format region specifies a header that is to be printed on each new page within a formatted document 355. The baseline position of this format region is normally in the top margin, but it can be positioned anywhere relative to the page origin. Typically, the header contains standard information such as the name, address and logo of the entity producing the document (e.g. a bank's name and address on a bank statement). It may also contain the page header contains information regarding a customer or account holder such as a name, an address, a phone number, and account number. |
| GRPHEADER | This format region specifies a header that is to be printed at the beginning of a group of data. If all of the data within a group of data cannot be formatted to fit on to a page within a formatted document 355, the group header will be reprinted on the next page after the page header, as applicable, and on each subsequent page within the document 355 until all the data in the group of data has been formatted. The baseline position of the group header can be specified as relative to other format regions on a page. There may be multiple group headers within a formatted document page. |
| PAGETRAILER | This format region specifies a trailer that is to be printed on each new page within a formatted document 355. The baseline position of this format type is normally in the bottom margin, but it can be positioned anywhere on a page and its placement can be relative to the other format regions on a page. |

Once the format regions are defined relative to each other on a page within a formatted document 355, each layout identifier that may be associated with the data stream 325 is associated with a format region as shown in step 530. Accordingly, each data record of the data stream 325 will be formatted within the format region that the data record's layout identifier has been associated with.

Once each layout identifier is associated with a format region, layout parameters are defined to control the placement of the associated data records within the format region for each layout identifier in step 540. The user may also specify within the layout parameters certain fixed data to be included in the formatted document 355 every time a certain layout identifier is encountered in the data stream 325.

Once all the layout parameters have been specified for all the layout identifiers applicable to a particular data stream 325, the layout parameters are sent to a formatter as a set of layout parameters 335 as shown in step 550.

It is envisioned that the layout program 330 could be implemented in software or hardware in a number of different embodiments. For instance, the layout program 330 could be resident on a computer system 200 that also contains the formatter 340, or it could reside on another computer system 200 that interacts with the computer system(s) 200 containing the formatter 340 over a network. Alternatively, the layout program 330 could be a routine of the formatter 340. Furthermore, the steps and the order of steps in FIG. 5 are merely exemplary and as such, it is envisioned that a layout program 330 may have more or less steps than illustrated and that the steps may be performed in a different order than illustrated.

An Exemplary Formatter

Figure 6:
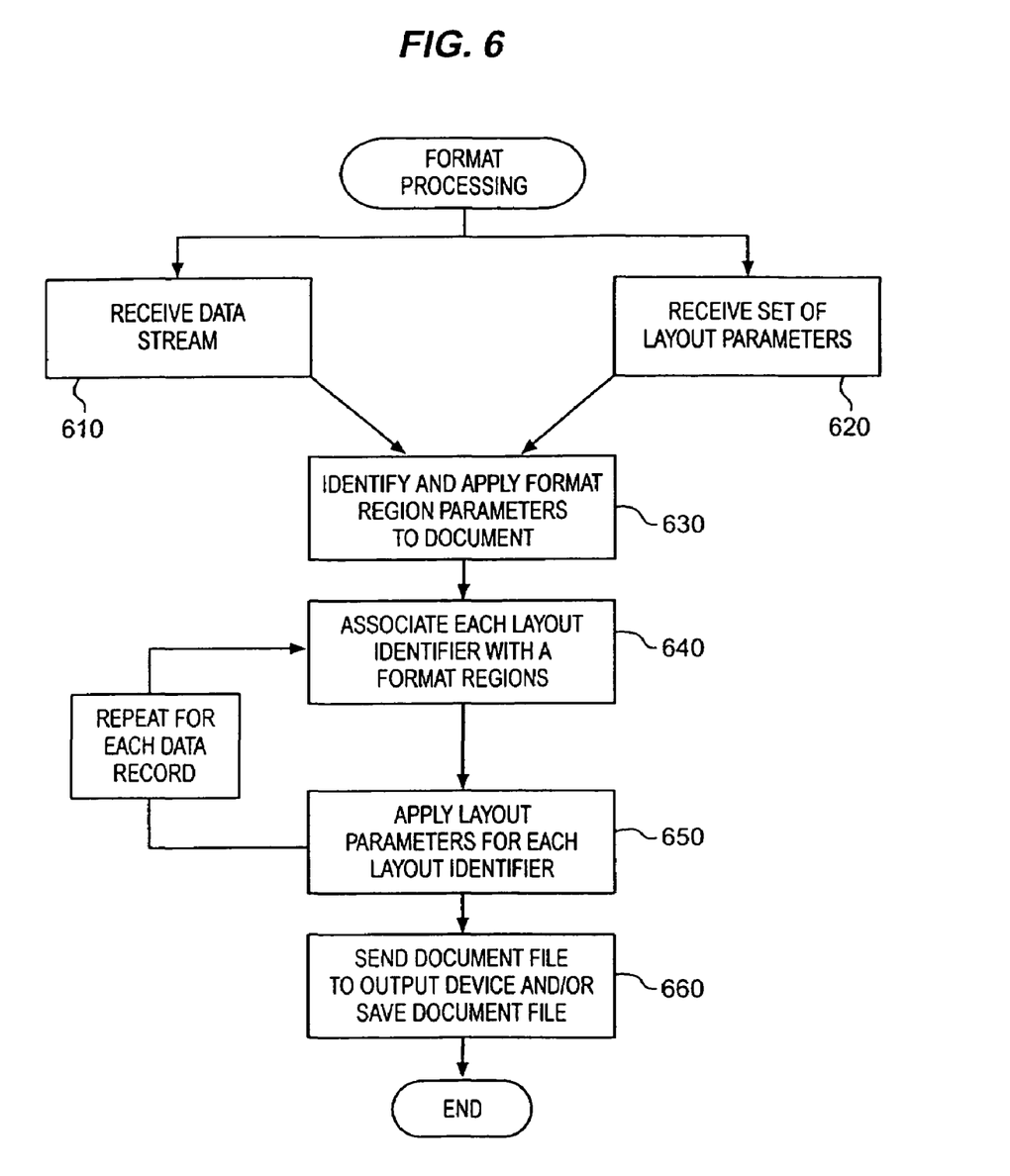
FIG. 6 is a flow diagram for an exemplary formatter.

FIG. 6 is a flow diagram showing the steps performed by an exemplary formatter 340 to create a format document data file 345 to be used by an output device to create the final formatted document 355.

Once the data stream 325 is sent to the formatter 340 and the formatter 340 has access to a set of layout parameters 335 as provided by a layout program 330, the formatter 340 merges fixed data from the set of layout parameters 335 with the variable text contained in the data stream 325, and applies the formatting instructions given in the set of layout parameters 335.

First, the formatter 340 receives data stream 325 from the data extraction program 320 as given in step 610. Next, the formatter 340 determines whether it has a set of layout parameters 335 to apply to the data stream 325. For example, in one embodiment, the formatter 340 may retrieve a set of layout parameters 335 from an associated data storage device, or in another embodiment, the formatter 340 may query a computer system 200 that is running the layout program 330 to have the computer system 200 send the formatter 340 a set of layout parameters 335. Simply stated, the formatter 340 receives a set of layout parameters 335 as indicated by step 620.

In step 630, the formatter 340 identifies and applies the proper parameters for each of the format regions as specified in the set of layout parameters 335. For instance a document may have a page header, a page trailer and one or more group headers and bodies. Typically, each page of a document will have only a single page header and page footer, but may have multiple bodies and group headers. The location of the format regions may be defined as a specific area on a page of a formatted document 355 or the positioning may be relative to another format region. For example, a group header may be positioned relative to a body that precedes it since the size of the body is likely to vary with the amount of data contained within it.

Next in step 640, each layout identifier is associated with a particular format region according to the set of layout parameters 335. Each data record associated with a particular layout identifier is formatted according to the layout parameters associated with the layout identifier in step 650. Step 640, and step 650 are repeated for each data record contained within the data stream 325.

Once all of the data records in the data stream 325 are formatted, the resulting formatted document data file 345 is saved, sent to an output device, or both as shown in step 660.

It is envisioned that the formatter 340 could be implemented in software or hardware in a number of different embodiments. For instance, the formatter 340 could be resident on a computer system 200 that also contains the data extraction program 320 and/or the layout program 330, or it could reside on another computer system 200 that interacts with the computer systems 200 containing the data extraction program 320 and the layout program 330. Alternatively, the formatter 340 could be a routine of the data extraction program 320 or the layout program 330. Furthermore, the steps and the order of steps in FIG. 6 are merely exemplary and as such, it is envisioned that a formatter 340 may have more or less steps than illustrated and that the steps may be performed in a different order than illustrated.

Bank Statement Example

Figure 7:
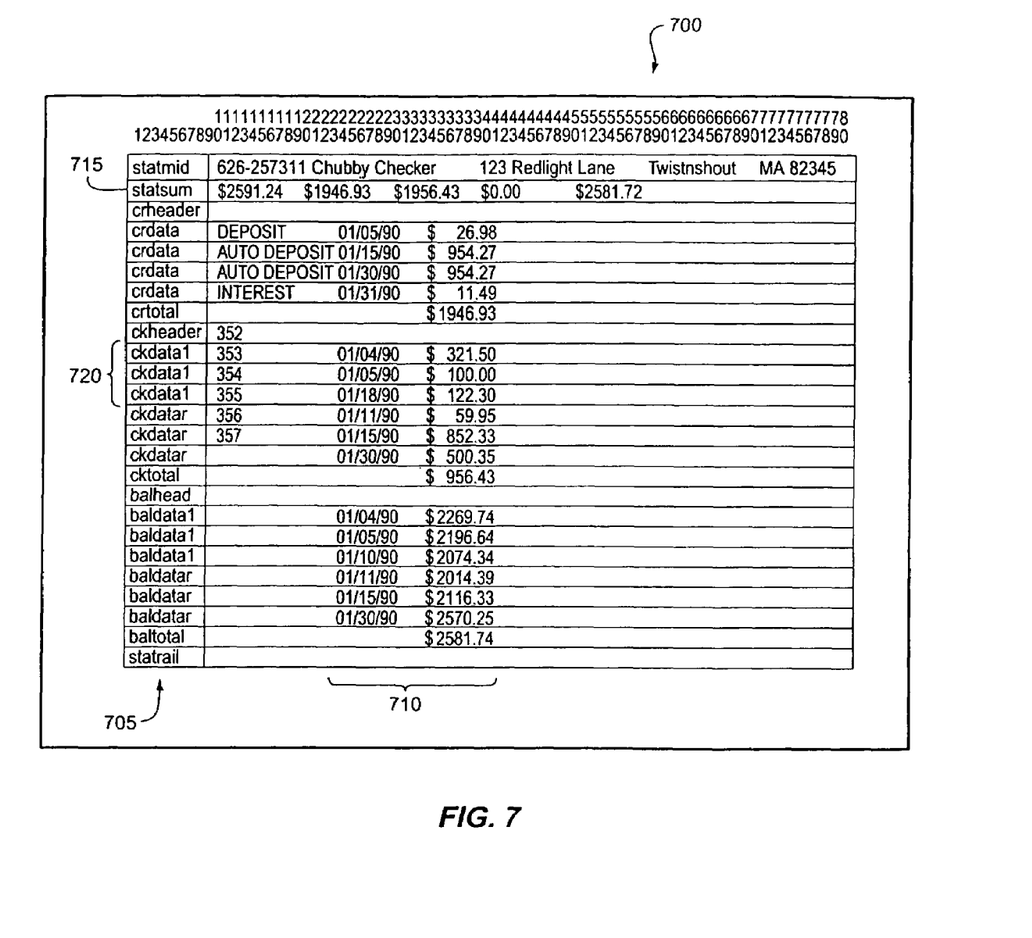
FIG. 7 is an example a data stream of line data records with layout identifiers for a bank statement.

FIG. 7 is an example of a data stream 700 that might be sent from a data extraction program 320 for a particular checking account. The data stream 700 is comprised of line data records 710 and layout identifiers 705. Each distinct layout identifier identifies the type of line data 710 that follows the layout identifier 705 in a particular line. For instance, the layout identifier 715, "statsum" indicates in the example that any data following it is statement summary data, and the layout identifier 720 "ckdata1" indicates that any data following it is information about a particular check that is to be formatted in a left column in the monthly statement.

Figure 8:
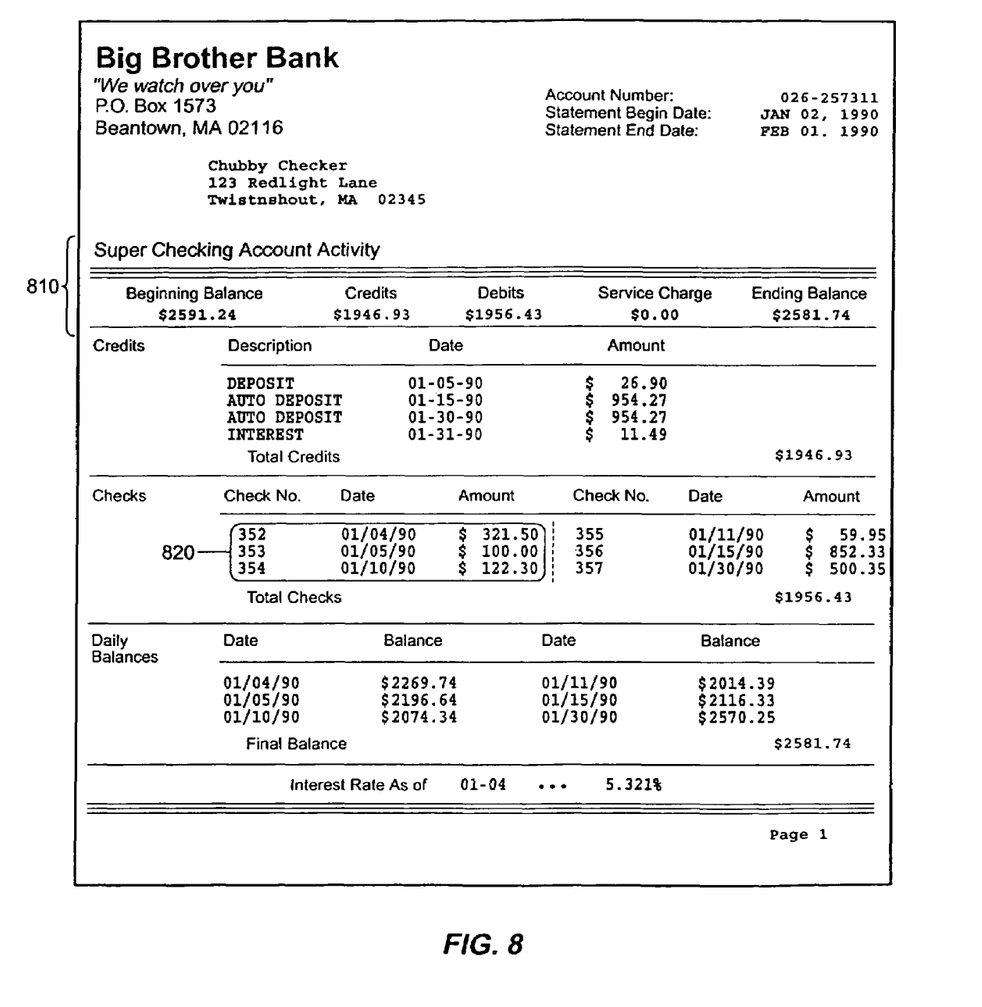
FIG. 8 is an example of a bank statement formatted according to an embodiment of the invention.

FIG. 8 is an example of a monthly bank statement 800 formatted using an embodiment of the invention. Area 810 indicates the place on the example statement where the statement summary data associated with the layout identifier 715 "statsum" was formatted. Area 820 indicates the place on the example statement where the statement summary data associated with the layout identifier 720 "ckdata1" was formatted.

Figure 9:
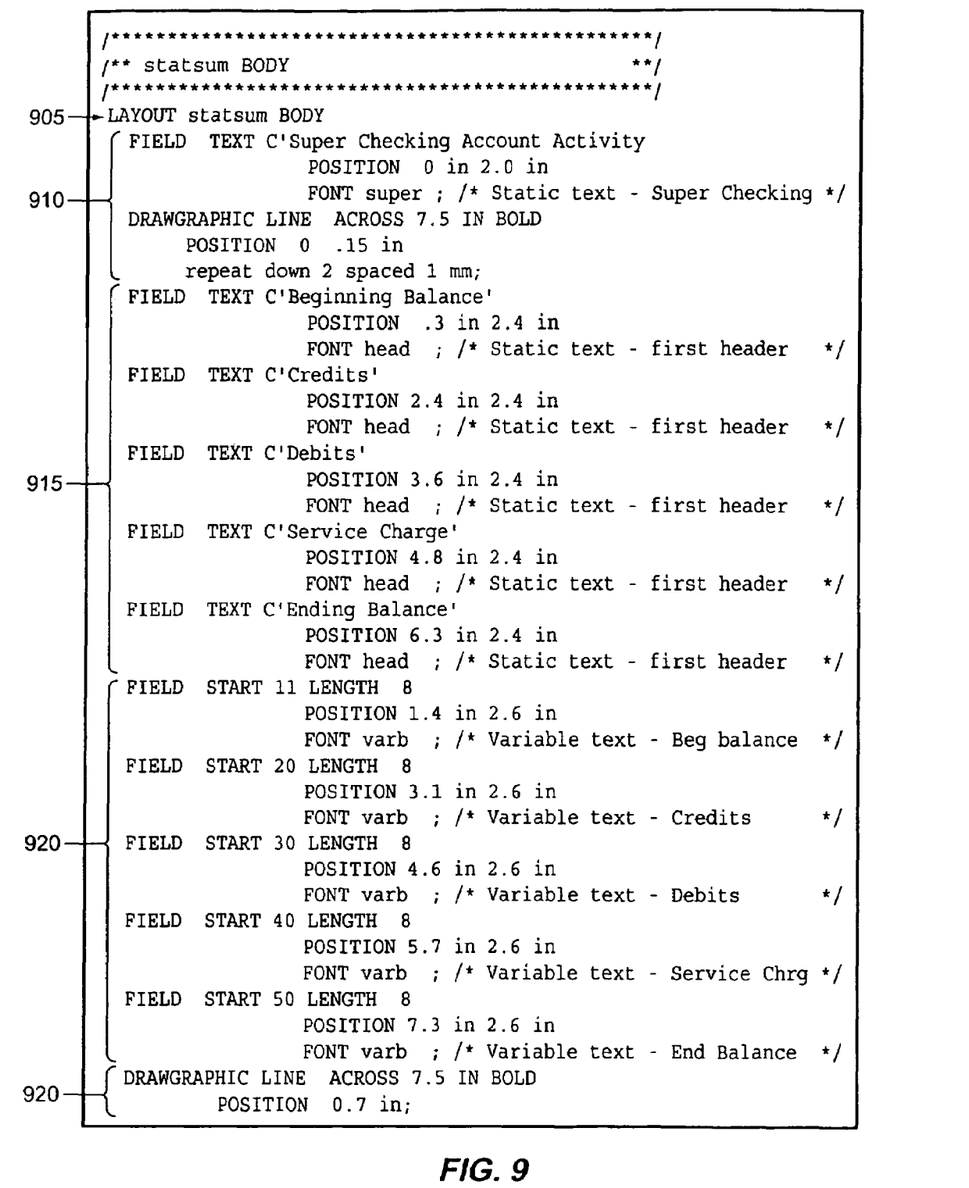
FIGS. 9 & 10 are layout parameter scripts generated by a layout program corresponding to particular layout identifiers for the bank statement example.
Figure 10:
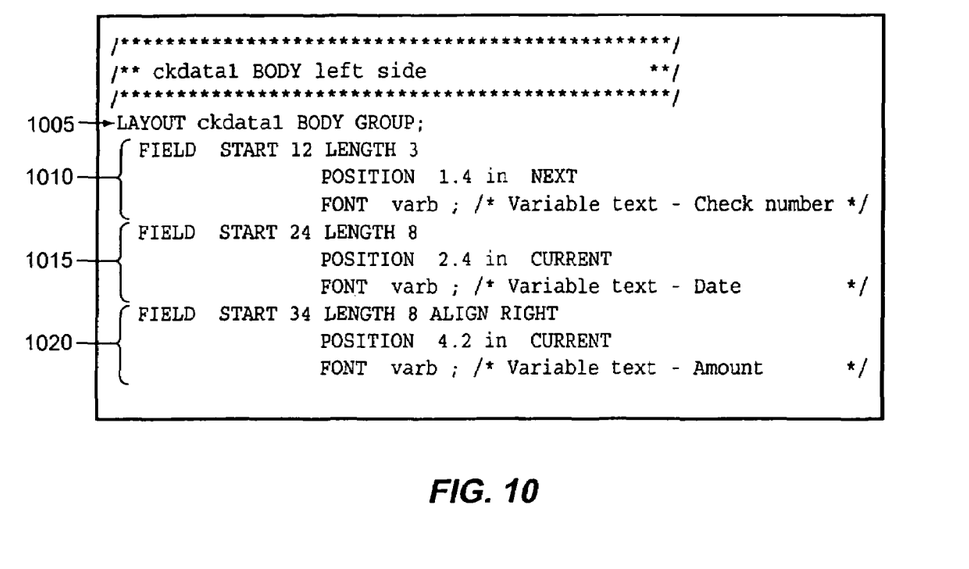

FIGS. 9 and 10 are examples of portions of the set of layout parameters that might be used by a formatter to layout and format portions of the monthly bank statement 800. FIG. 9 provides formatting rules, instructions, and fixed text related to the "statsum" layout identifier 715. FIG. 10 provides the rules and instructions relating to the placement of check data related to "ckdata1" layout identifier 720. The rules, instructions and fixed text of FIGS. 9 and 10 along with additional rules, instructions, and fixed text for each of the other layout identifiers 705 that appear in the data stream 700 collectively comprise a set of layout parameters for a bank statement.

Figure 11:
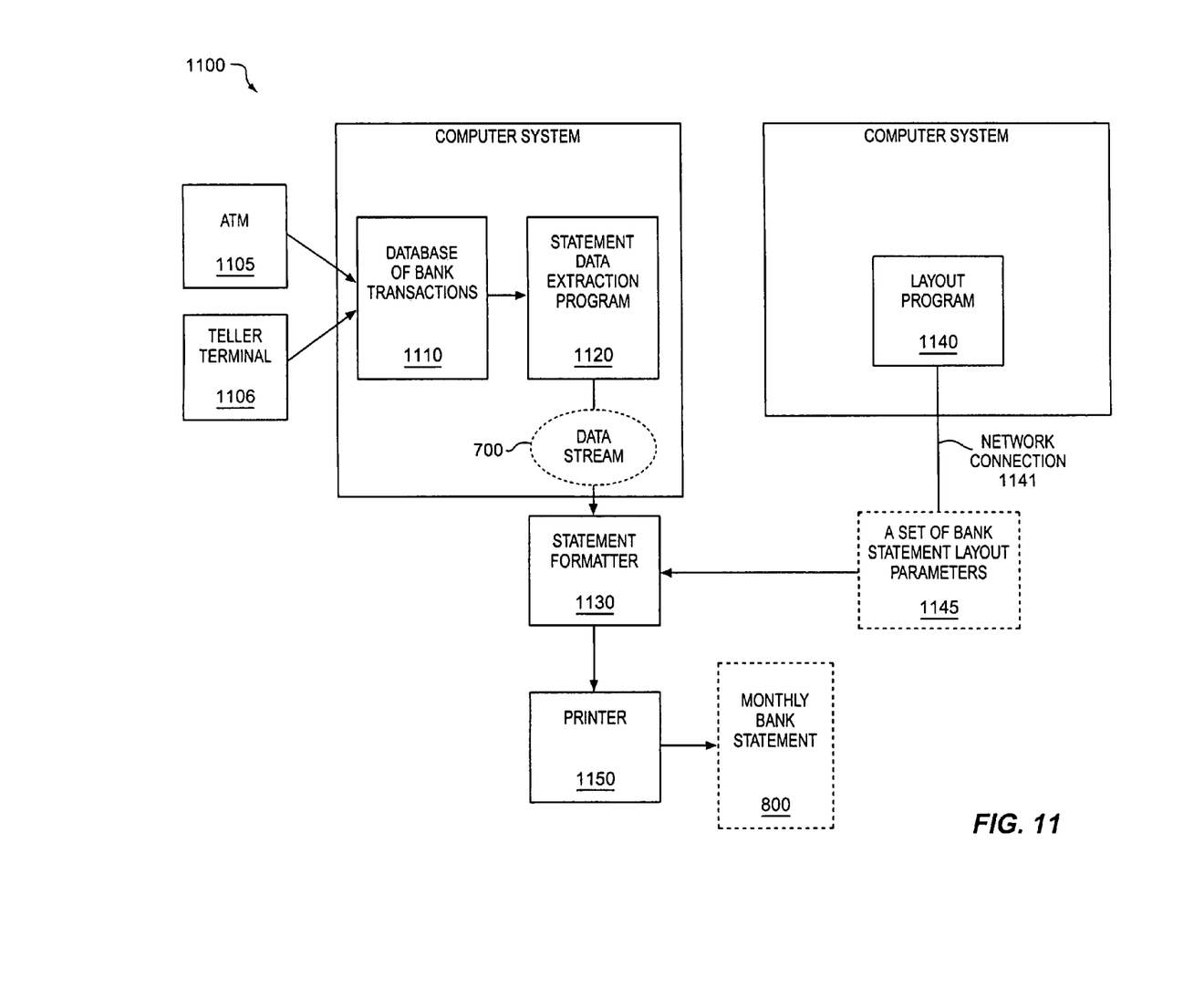
FIG. 11 is a block diagram of a computing environment that might be used to produce the example Bank Statement.

FIG. 11 is a block diagram of a computing environment that might be used by a bank or other financial institution to generate the bank statement 800. Information activity on the bank account is entered into a database of bank transactions 1110 from a variety of sources including, but not limited to, ATM machines 1105, and bank teller terminals 1106. On a periodic basis, such as monthly, a statement data extraction program 1120 extracts all data relating to a particular bank account from the database of bank transactions 1110. The statement data extraction program 1120 uses the data to calculate new pieces of data that will be included in the monthly bank statement 800. For instance, the balance at the beginning and end of the statement period may be calculated. The total dollar amount of credits made to the account and the total dollar amount of checks written against the account may also be determined for statement period. The data is then formatted into a data stream 700 of line data records 710 to which a layout identifier 705 is added to the front of each line data record to indicate the type of information contained within in the line data record relative to the line data record's eventual location in the formatted monthly statement 800. Finally, the statement data extraction program 1120 sends data stream 700 to a statement formatter 1130.

Typically, at some point prior to generation of the data stream 700 by a statement data extraction program 1120, a set of bank statement layout parameters must be generated by a layout program 1140. The layout rules and instructions are generated for each layout identifier that may appear in an associated data stream 700, and they are put into a format that is capable of being read and executed by the statement formatter 1130. A set of bank statement layout parameters 1145 for each of the associated layout identifiers is sent to the statement formatter 1130 over a network connection 1141. As shown in FIG. 11, the layout program is resident on a computer system 200 separate and distinct to the computer system 200 that holds the database of bank transactions 1110 and the statement data extraction program 1120. Although this separation is not necessary to practice the invention in this example, it may be desirous to prevent the layout program operator from having access to the bank's customers sensitive and personal financial information.

When the statement formatter 1130 receives the data stream 700 from the statement data extraction program 1120, it applies the rules and instructions contained in the set of bank statement layout parameters 1145 to each line data record 710 based on the layout identifier associated with the line data record to format that line data record. For instance, when the formatter 340 encounters a line data record associated with the layout identifier 715 "statsum", it references and applies the layout parameters given in FIG. 9. The statement formatter 1130 first identifies that information associated with the layout identifier 715 "statsum" is to be placed within the "Body" format region on a page as shown by instruction 905. The fixed (or static text) term, "Super Checking Account Activity" is formatted at the specified position (0" in from the left margin and 2" down from the top of the "Body" format region) in the "super" font, then three bold lines are placed in the specified position as per instruction 910. Various headers of fixed text are placed at various positions from the left margin, 2.4" down from the top of the "Body" as per instruction 915. Next, according to instruction 920, the various pieces of variable text in the form of dollar amounts are placed below the headers. For instance, instruction 920 directs the statement formatter 1130 to place the text, $2591.24, which begins at the $11^{th}$ byte of information in the associated line data record, 1.4" in from the left margin and 2.6" down form the top of the "Body." Finally, a fixed line is placed below the variable text as per instruction 925.

Additionally, when the statement formatter 1130 encounters a line data record associated with the layout identifier 720 "ckdata1", it references and applies the layout parameters given in FIG. 10 to the line data record. The statement formatter 1130 first identifies that the line data record associated with the layout identifier 720 is to be placed within the "Body" format area on a page as shown by instruction 1005. As per instruction 1010, the check number from the line data record is placed 1.4" in from the left margin of the "Body" format region in the next available line for formatting relative to the last previously formatted line. Next, as per instructions 1015 and 1020, the date and the amount of the check are placed on the same, or current, line as the check number in from the left margin of the "Body" 2.4" and 4.2" respectively. When a statement formatter 1130 reads additional line data records associated with the "ckdata1" layout identifier 720, it formats the next additional line data record in the next available print line within the "Body" format region. For instance in FIG. 8, area 820, check number 353 information is placed below the information for check 352, and the information for check 354 is placed below check 353.

Once the statement formatter 1130 formats all of the statement line data records for a particular bank statement, the file containing the formatted document 800 is sent to a printer 1150 for printing.

Although the example of a bank statement is presented, the content of a document formatted using this invention is limitless and may encompass, but is not limited to, financial statements, telephone bills, utility bills, invoices, and inventory statements. The bank statement example is, therefore, merely, illustrative.

What is claimed is:

1. A method of formatting documents comprising:
receiving a data stream in which each data record includes line data records therein and is associated with a layout identifier indicating a type of data included within a data record at a first computer;
associating a first layout identifier with a first format region defining a first area on a document page;
associating a second layout identifier with a second format region defining a second area on the document page;
receiving layout parameters including formatting instructions relating to the presentation of data records in a document and specifying fixed data to be included in a format region each time a particular layout identifier is encountered, wherein a first set of layout parameters correspond to the first format region and controls placement of each data record within the first format region on the document page and a second set of layout parameters correspond to the second format region and controls placement of each data record within the second format region on the document page;
formatting each data record within a corresponding format region at a second computer; and
dynamically creating the document by applying the first set of layout parameters corresponding to the first layout identifier to each data record associated with the first layout identifier and applying the second set of layout parameters corresponding to the second layout identifier to each data record associated with second layout identifier.

2. The method of claim 1, wherein the document is sent to a printer for printing.

3. The method of claim 1, wherein the layout parameters include data to be formatted in the document.

4. The method of claim 1 wherein formatting instructions are specified for the first and second format regions.

5. The method of claim 4, wherein each data record formatted within a format region of a first type is repeated at the beginning of each page of the document.

6. The method of claim 5, wherein each data record formatted within a format region of a second type is repeated at the end of each page of the document.

7. The method of claim 6, wherein each data record formatted within a format region of a third type is repeated on each page of the document above a grouping of related data records formatted within a format region of a fourth type until all of the grouping of related data records have been formatted.

8. A machine-readable medium having stored thereon instructions, which when executed by one or more processors, cause the one or more processors to perform the following:

receiving a data stream in which each data record includes line data records therein and is associated with a layout identifier indicating a type of data included within a data record at a first computer;

associating a first layout identifier with a first format region defining a first area on a document page;

associating a second layout identifier with a second format region defining a second area on the document page;

receiving layout parameters including formatting instructions relating to the presentation of data records in a document and specifying fixed data to be included in a format region each time a particular layout identifier is encountered, wherein a first set of layout parameters correspond to the first format region and controls placement of each data record within the first format region on the document page and a second set of layout parameters correspond to the second format region and controls placement of each data record within the second format region on the document page.

9. The machine-readable medium of claim 8, wherein the document is sent to a printer for printing.

10. The machine-readable medium of claim 8, wherein the layout parameters include data to be formatted in the document.

11. The machine-readable medium of claim 8, wherein the instructions when executed by the one or more processors further cause the one or more processors to perform formatting instructions to be specified for the first and second format regions.

12. The machine-readable medium of claim 11, wherein each data record formatted within a format region of a first type is repeated at the beginning of each page of the document.

13. The machine-readable medium of claim 12, wherein each data record formatted within a format region of a second type is repeated at the end of each page of the document.

14. The machine-readable medium of claim 13, wherein each data record formatted within a format region of a third type is repeated on each page of the document above a grouping of related data records formatted within a format region of a fourth type until all of the grouping of related data records have been formatted.

* * * * *